United States Patent Office 3,261,863
Patented July 19, 1966

3,261,863
PRODUCTION OF ALKALI METAL
TEREPHTHALATES
Walter Schenk, Heidelberg, and Albrecht Wallis, Ludwigshafen (Rhine), Germany, assignors to Badische Anilin- & Soda-Fabrik Aktiengesellschaft, Ludwigshafen (Rhine), Germany
No Drawing. Filed Aug. 13, 1962, Ser. No. 216,324
Claims priority, application Germany, July 8, 1961, B 63,190
7 Claims. (Cl. 260—515)

This application is a continuation-in-part of our copending application Serial No. 207,775, file July 5, 1962, now abandoned.

This invention relates to the production of alkali metal terephthalates. More particularly, the invention relates to a process for recycling the catalyst in the production of alkali metal terephthalates by thermal conversion of alkali metal salts of other benzenecarboxylic acids.

It is known that alkali metal salts of cyclic carboxylic acids with an aromatic character are obtained by heating alkali metal salts of other cyclic carboxylic acids to a temperature between 280 and 480° C. in the presence of catalysts at normal or elevated pressure. Examples of catalysts that are used are zinc, iron and cadmium oxide or carbonate, or salts of these metals and organic acids. The proportion of catalyst employed is about 2 to 5 percent by weight, calculated on the alkali metal salts to be converted. After heating, the mixture of salts is dissolved in water, filtered, and the free carboxylic acids are precipitated by acidifying the alkali metal salt solution with a mineral acid, with the cyclic carboxylic acid used as the starting acid, or with carbon dioxide under pressure.

The object of the present invention is to provide a process by which the catalyst employed for the thermal conversion of potassium salts or a mixture of potassium and sodium salts of benzenecarboxylic acids in which the proportion of potassium lies between 30 and 100% can be reused without prior chemical treatment for the thermal conversion of alkali metal salts of benzenecarboxylic acids.

This object is achieved by adjusting the aqueous solution of a reaction mixture obtained by catalytic thermal treatment of potassium salts or mixtures of potassium and sodium salts of other benzenecarboxylic acids, in which the proportion of potassium is at least 30% by weight, to a pH value between 7 and 9 by introducing carbon dioxide, filtering the solution and adding the residue as catalyst to a starting material to be used for the thermal conversion. The mixture of sodium and potassium salts preferably contains 50 to 95% by weight of the potassium salt.

Contrary to expectation, this residue, which contains the catalyst in a very impure form, displays adequate catalytic activity and that the cracked products of a humic acid nature contained in the residue do not become enriched even after weeks of recycling.

In prior processes, a more or less troublesome recovery of the residue containing the catalyst was always involved, for example, treatment with nitric acid followed by precipitation of the catalyst metal from the solution. Another method that was just as troublesome consisted in extracting the residue with the aid of organic solvents.

The carbon content of the residue reaches a value between 1.5 and 2.5% by weight of the thermally treated material.

It has been found that, surprisingly, the activity of the catalyst recharged in this manner to the thermal isomerization process is higher than that of the best of the catalysts prepared via the corresponding organic salts of the metals. Th reason for this is that the catalyst is precipitated during the thermal conversion onto the decomposition products in pyrophoric form and is thus extremely surface-active. An especially active catalyst is obtained by adding the reaction product to the water to be used for dissolving the alkali metal terephthalate direct and away from air, preferably in an atmosphere of carbon dioxide.

The dried salt mixture that is obtained from the thermal conversion and that a strongly alkaline as a result of decomposition reactions is dissolved in water, a solution with an average pH value of between 9 and 12 being thus obtained. Carbon dioxide is then led into the solution until the isoelectric point is attained. Quantitative flocculation of all colloidal components is then brought about by heating. By this procedure, the colored colloidal bodies part of which are stabilized by electric charges cannot be removed by filtration and still contain some of the catalyst metal are also precipitated. A further advantage of this procedure arises in the subsequent recovery of the conversion material. Moreover, the carbonaceous particles recycled to the conversion mixture assume the function of a purification or filtration aid and considerably facilitate filtering the solution of conversion products. The clarification thus realized attains that which would be achieved by activated charcoal.

The process in accordance with the present invention entails considerable simplifications and cost reductions in the process, but in addition ensures increased yield, since the organic salts of the metals still embedded in the carbonaceous residues from the thermal conversion, salts which for the most part cannot be removed economically by washing, e.g., phthalates, terephthalates, and benzoates together with large quantities of potassium ions, are returned to the process.

The invention is further illustrated by, but not limited to, the following examples, in which parts are by weight.

*Example 1*

If a mixture that has been produced by the thermal conversion of 363 parts dipotassium phthalate and 8.6 parts cadmium carbonate at a reaction temperature of 435° C. and a carbon dioxide pressure of 10 atmospheres is treated with water while stirring, a dark-colored, very difficultly filtrable solution with a pH of 10.4 is obtained in which the water-insoluble phase is suspended as a black residue. When the solution is heated to 70–80° C. and carbon dioxide is slowly led in with further stirring, a pH of 8.1 is obtained. The colloidal colored bodies flocculate, a clear, colorless solution of the carboxylic acid salts being obtained. A carbonaceous residue remains on the filter, and this contains, besides a considerable amount of moisture and the cadmium added as catalyst, embedded, neutral carboxylic acid salts. The following composition of the carbonaceous residue was determined by analysis:

|  | Parts |
|---|---|
| Water | 63 |
| Cadmium | 5.6 |
| Dipotassium terephthalate | 5.5 |
| Dipotassium phthalate | 1.2 |
| Potassium benzoate | 0.8 |
| Insolubles in acids | 10.8 |
| Potassium in other forms, mainly as carbonate | 7.1 |

The terephthalic acid in the filtrate is precipitated with a mineral acid or, with a view to quantitative recycling of potassium, is freed as described in U.S. Patent No. 2,930,813 the yield being 94% of the theoretical, calculated on the convertible phthalate employed. The carbonaceous residue, however, yields after drying at 130° C. on a drum drier 31 parts of a black, finely divided powder, in which all the catalyst is contained.

This is stirred with an intensive mixer into a 22% dipotassium phthalate solution at a temperature of about 110° C. until a ratio is attained of 31 parts of dry powder to 363 parts of dipotassium phthalate. After the salt mixture has been atomized in a spray evaporator to a dry powder with a bulk density of about 0.55 to 0.65, it is found that one catalyst particle is contained in each convertible phthalate grain. The moisture content of the strongly hygroscopic potassium salt mixture is then reduced to a value of less than 0.01% by subsequent heating at about 250° C., and is once more subjected to the isomerisation reaction. After this, the product of the thermal conversion is again worked up in the manner described above 239.5 parts of pure terephthalic acid being obtained. The carbonaceous dry slurry with the catalyst now contains 2.4 parts that are insoluble in acid, calculated on the dry conversion mixture employed, a proportion that remains constant even after weeks of recycling the catalyst powder in the recycle process in the manner described above. Only the handling losses occurring in operation must be replaced by the occasional addition of cadmium carbonate in such a manner that the cadmium proportion contained in the conversion salt mixture is kept at about 1.5%. The isomerization yield of terephthalic acid remains constant at between 94 and 97% of the theoretical value.

*Example 2*

A crude reaction product which consists essentially of dipotassium terephthalate and has been obtained in conventional manner by thermal disproportionation of 240 parts of potassium benzoate, in the presence of 18 parts of zinc benzoate as catalyst, at a reaction temperature of 445° C. and a carbon dioxide pressure of 31 atmospheres, is dissolved in 920 parts of water at about 80° C. while stirring. The catalyst fraction present as a mixture of zinc oxide and zinc carbonate is completely converted into basic zinc carbonate by the carbonate fraction formed by degradation in the thermal reaction. The alkaline-reacting solution is then filtered off from the undissolved portion which contains the catalyst fraction together with a small amount of a finely divided carbonaceous residue. The water insoluble filter residue is washed with 50 parts of that water to dissolve out the dipotassium terephthalate still contained therein. The terephthalic acid is precipitated and isolated from the clear filtrate solution by the process described in U.S. Patent No. 2,930,813 using benzoic acid. 113.5 parts pure terephthalic acid is obtained.

Obviously, it is also possible to adjust the alkaline-reacting terephthalate solution, as described in Example 1, to near the neutral point prior to separation of the water-insoluble residue, for example, by introducing carbon dioxide or acidifying with benzoic acid or phthalic acid, in order to facilitate further processing. In this case, a separator may be used for separating the carbonaceous residue.

The water-insoluble residue which in addition to carbonaceous substances of an acid nature and some enclosed dipotassium terephthalate and potassium benzoate contains the entire catalyst fraction as zinc carbonate in extremely finely divided form and which, owing to its high water content of approximately 60%, is present in the form of a paste, is added as catalyst to fresh initial salt for thermal disproportionation without further processing. The black pasty catalyst residue is added to the potassium benzoate solution from the precipitation of the terephthalic acid, the suspension atomized in a spray evaporator and the dry salt mixture returned to the thermal reaction for conversion into dipotassium terephthalate without adding further catalyst. No decrease in yield is observed even if such recycling is repeated several times.

What we claim is:

1. In a process for the production of an alkali metal salt of terephthalic acid by heating an initial salt reactant selected from the group consisting of
    the potassium and sodium salts of other benzene carboxylic acids, with the proviso that the initial salt reactant contains a potassium salt proportion of at least 30% by weight,
to a temperature between about 280° C. and 480° C. in the presence of an initial catalyst selected from the group consisting of the oxides, carbonates and organic acid salts of zinc and cadmium, and then dissolving the reaction product in water with a solid carbonaceous material remaining undissolved in said water, the improvement of the catalytic effect of said process which comprises:
    adjusting the aqueous solution of the reaction product to a pH value between 7 and 9 by introducing carbon dioxide into said solution; filtering said solution, in which the crude reaction product remains dissolved, for removal of said carbonaceous material as a residue together with said catalyst; and adding the catalyst-containing carbonaceous residue of said filtration directly to said initial salt reactant as a catalyst in said process.

2. A process as claimed in claim 1 wherein said heating is carried out under normal pressure.

3. A process as claimed in claim 1 wherein said heating is carried out under elevated pressure.

4. A process as claimed in claim 1 wherein the initial salt reactant consists of a mixture of said potassium and sodium salts containing a potassium salt proportion of about 50 to 95% by weight.

5. A process as claimed in claim 1 wherein said residue is first dried and then directly suspended as a finely divided powder in a solution of said initial salt reactant, which solution is then atomized to yield a dry initial salt mixture to be heated in said process.

6. A process as claimed in claim 1 wherein the initial catalyst is cadmium carbonate.

7. A process as claimed in claim 1 wherein the initial catalyst is zinc benzoate.

References Cited by the Examiner

UNITED STATES PATENTS

| | | | |
|---|---|---|---|
| 2,848,487 | 8/1958 | Keen | 260—515 |
| 2,865,708 | 12/1958 | Dinsmore et al. | 260—525 |
| 2,930,813 | 3/1960 | Schenk et al. | 260—515 |
| 2,931,829 | 5/1960 | Schenk | 260—515 |
| 2,948,750 | 8/1960 | Blaser et al. | 260—515 |

FOREIGN PATENTS 813,182   5/1959   Great Britain.

OTHER REFERENCES

Sherwood: "Chem. and Industry," August 27, 1960, pp. 1096–1100.

LORRAINE A. WEINBERGER, *Primary Examiner.*

LEON ZITVER, *Examiner.*

R. K. JACKSON, R. C. MASSA, T. L. GALLOWAY,
*Assistant Examiners.*